United States Patent
Becker et al.

(10) Patent No.: US 6,845,674 B2
(45) Date of Patent: Jan. 25, 2005

(54) TRANSFER FLUID FOR PRESSURE MEASUREMENT TECHNOLOGY AND ITS APPLICATION

(75) Inventors: Roman Becker, Klingenberg/Main (DE); Albrecht Kalisch, Miltenberg (DE); Jürgen Pleyer, Stockstadt (DE); Peter Petter, Grossheubach (DE)

(73) Assignee: WIKA Alexander Wiegand GmbH & Co. KG, Klingenberg/Main (DE)

( * ) Notice: Subject to any disclaimer, the term of this patent is extended or adjusted under 35 U.S.C. 154(b) by 0 days.

(21) Appl. No.: 10/128,067

(22) Filed: Apr. 23, 2002

(65) Prior Publication Data

US 2002/0178824 A1 Dec. 5, 2002

(30) Foreign Application Priority Data

Apr. 27, 2001 (DE) ..................................... 201 07 260 U

(51) Int. Cl.⁷ .............................. G01L 9/00; G01L 7/08
(52) U.S. Cl. ............................. 73/717; 73/715; 73/723; 73/721

(58) Field of Search .......................... 73/715, 717, 721, 73/723, 756; 202/205, 206, 39; 123/480, 491; 507/103; 428/68, 76

(56) References Cited

U.S. PATENT DOCUMENTS

| | | | | | |
|---|---|---|---|---|---|
| 4,135,408 | A | * | 1/1979 | Di Giovanni | 73/721 |
| 4,466,290 | A | * | 8/1984 | Frick | 73/756 |
| 5,050,392 | A | * | 9/1991 | Messmer et al. | 62/114 |
| 5,712,428 | A | * | 1/1998 | Schleiferbock | 73/708 |
| 5,869,164 | A | * | 2/1999 | Nickerson et al. | 428/76 |
| 6,165,142 | A | * | 12/2000 | Bar | 600/595 |
| 6,331,509 | B1 | * | 12/2001 | Heimann et al. | 508/136 |

* cited by examiner

Primary Examiner—Andrew H. Hirshfeld
Assistant Examiner—Marissa Ferguson
(74) Attorney, Agent, or Firm—Roth & Goldman, P.A.

(57) ABSTRACT

Transfer fluid, in particular for electrical pressure transducers and pressure transmitters, that transfers deflections of a separating element between a substance to be measured and the transfer fluid to a pressure measurement arrangement, the transfer fluid comprising a polyalphaolefin (PAO 6).

11 Claims, 3 Drawing Sheets

TRANSFER FLUID FOR PRESSURE MEASUREMENT TECHNOLOGY AND ITS APPLICATION

Figure 1:
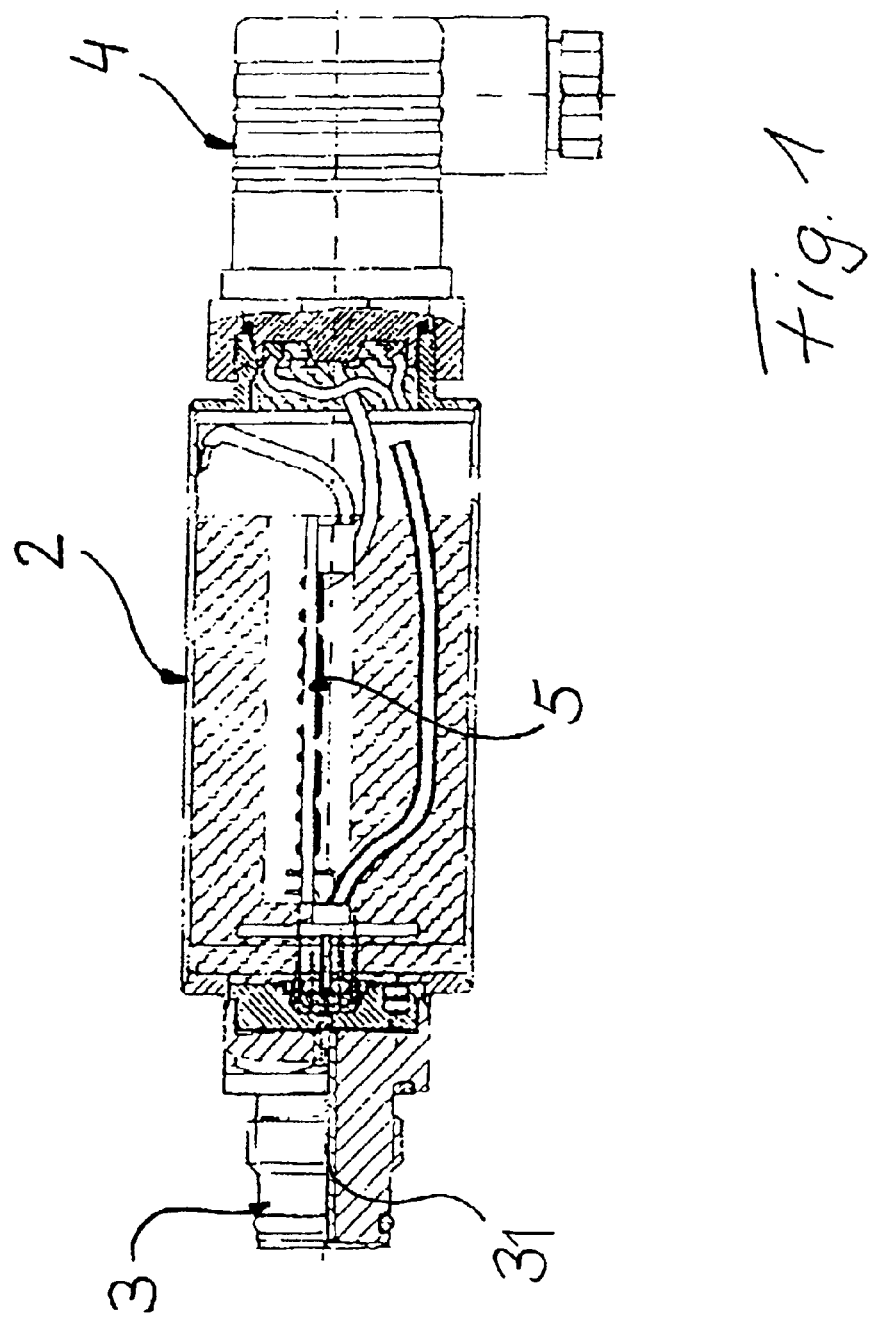

The invention relates to a pressure transfer fluid, also referred to as fill fluid, in particular for use in pressure transmitters and electrical pressure transducers.

An electrical pressure transducer usually has a sensing diaphragm and a separating or isolating diaphragm which, along with a housing, delimit a closed space that is filled for the transfer of pressure with a transfer fluid or fill fluid. Many sensor elements, such as piezoresistive sensor elements, whose silicon diaphragms and electrical contacts of sensor elements are not as a rule resistant to the substance to be measured, must be isolated from the substance to be measured to prevent damage to the sensor element.

Moreover, frequently, contact of the substance to be measured with a sensing diaphragm is undesirable if the sensing diaphragm includes, for example, components that could damage the substance to be measured. For this reason, the use of an isolating diaphragm is a procedure to reliably avoid these aforementioned disadvantages. The pressures to be measured of the substance deform the isolating diaphragm and, because of the complete filling of the space delimited by the separating or isolating diaphragm and the sensing diaphragm, the virtually incompressible transfer fluid transfers the deflection of the isolating diaphragm substantially unchanged to the sensing diaphragm. Thus, the pressure in the substance to be measured can be measured without the sensing diaphragm making direct contact with the substance to be measured.

A similar concept underlies the use of pressure transmitters that are connected between the substance to be measured and a pressure gage in order to avoid direct contact of the substance to be measured and the gage, i.e., the gage is physically isolated from the substance to be measured and the signal to be measured is transferred hydraulically to the gage. Pressure transmitters usually have a diaphragm or another element deformable depending on a pressure differential, that is acted on on one side by the substance to be measured and on the other by the pressure transfer fluid. By means of this media isolation, not only are contacts of the gage with the substance to be measured avoided, but pressure transmitters are frequently also used in the measurement of pressures at high temperatures, in order to protect the gage from too high a temperature. Pressure transmitters are also frequently used in hydraulic remote sensing of pressures, whereby the transmission line connected with the pressure transmitter is filled with the fill fluid in order to transfer the changes in pressure in the substance to be measured to the gage.

In gages and their peripheral equipment regardless of the type, i.e., in pressure transducers and in pressure transmitters, an effort is made in principle to use a device which measures as accurately as possible or at least with constant deviations. This may be achieved either by design measures in the gage or its peripheral equipment, or by good adaptation of the materials used or of the gage to the measurement values to be anticipated and to the environment where they are used.

Pressure transducers and pressure transmitters are widely used to measure pressure in a large number of extremely different applications and processes in the most varied industries and areas of life. Consequently, there is a very large number of different pressure transducers and pressure transmitters, in particular in light of the pressures to be measured as well as with regard to the temperatures of the substances to be measured or of the environment. There are also a number of special applications, such as in the food industry that place high demands on the physiological safety of the materials used in the system and measurement engineering.

These respective special demands on pressure transducers and pressure transmitters have resulted in a large variety of variants of particularly specialized designs, which require great care, especially with regard to inventories (warehousing of parts and finished products), production control, and delivery, resulting in additional costs.

For the food industry, only approved materials may be used in the systems engineering; this refers also to the transfer fluid in the aforementioned pressure transducers and pressure transmitters. Consequently, white oils that are physiologically safe have gained acceptance as transfer fluid for pressure transducers and pressure transmitters for the food industry.

A large number of technical demands are made on the transfer fluid, particularly with regard to compressibility and viscosity, including the temperature dependency of these parameters, to steam pressure, to temperature or resistance, to aging stability, to material compatibility with the sensor element, to toxicity, etc. Consequently, for the respective conditions of use of the pressure transducers and pressure transmitters, there is a particularly suitable transfer fluid, i.e., the adaptation to the purpose, the area of use, the conditions of use, and the like is always necessary in the combination of pressure transducers or pressure transmitters with the appropriate transfer fluid. However, there are also special adaptation requirements which have resulted in no satisfactory technical solutions with the prior art transfer fluids.

For example, the use of white oils customary in the food industry is difficult in low temperature ranges since their viscosity increases significantly with decreasing temperature. For applications outside the food industry, silicon oil has gained acceptance as a transfer fluid at low temperatures; however, it is not approved, for example, for food applications.

There are other applications, in addition to those in the food industry, that also require silicon-free transfer fluids even at low temperatures; for these applications there has previously been no practicable solution.

Consequently, the object of the invention is to find a transfer fluid for pressure transducers and pressure transmitters that covers a broad range of temperatures and is also suitable for use in the food industry.

This object is achieved with a transfer fluid according to claim 1.

According to the invention, the transfer fluid is a polyalphaolefin that is approved by food regulations. The polyalphaolefin as a transfer fluid remains usable even in a temperature range in which silicon oil has had to be used previously.

Consequently, such a pressure transducer or a pressure transmitter that operates with this transfer fluid can be used successfully not only in the food sector, at all usual temperatures, but also in other industrial sectors at temperatures at which the conventional white oil is no longer usable.

Thus, the same transfer fluid can be used in a broad range of applications including the food industry, where previously different transfer fluids were used. Consequently, the variety of variants of pressure transducers already filled during manufacture is significantly reduced, whereby significant cost savings can be achieved in production control, warehousing, and delivery.

Also, it suffices to provide one transfer fluid for a variety of applications and designs of pressure transmitters that are not filled until they are connected with the gage.

Thus, with the transfer fluid discovered, not only is the problem of being able to more reliably and more accurately perform measurements in the food industry sector solved, but the large variety of variants and the associated expense is also reduced.

Figure 2:
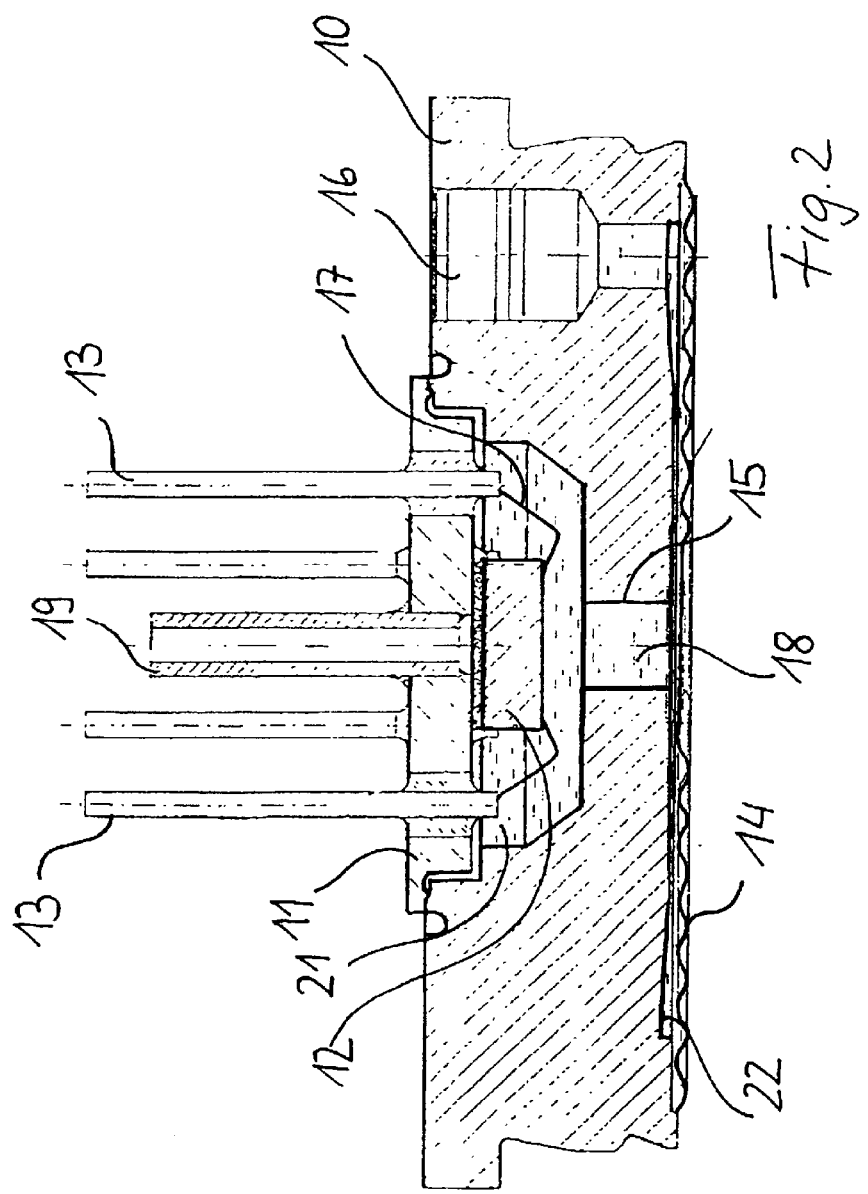

Exemplary applications of the pressure transfer fluid in a pressure transducer and in a pressure transmitter discovered according to the invention are explained in detail with reference to the drawings. They depict:

FIG. 1 a sectional view of a piezoresistive pressure transducer;

FIG. 2 a detail from FIG. 1 in a sectional view; and

Figure 3:
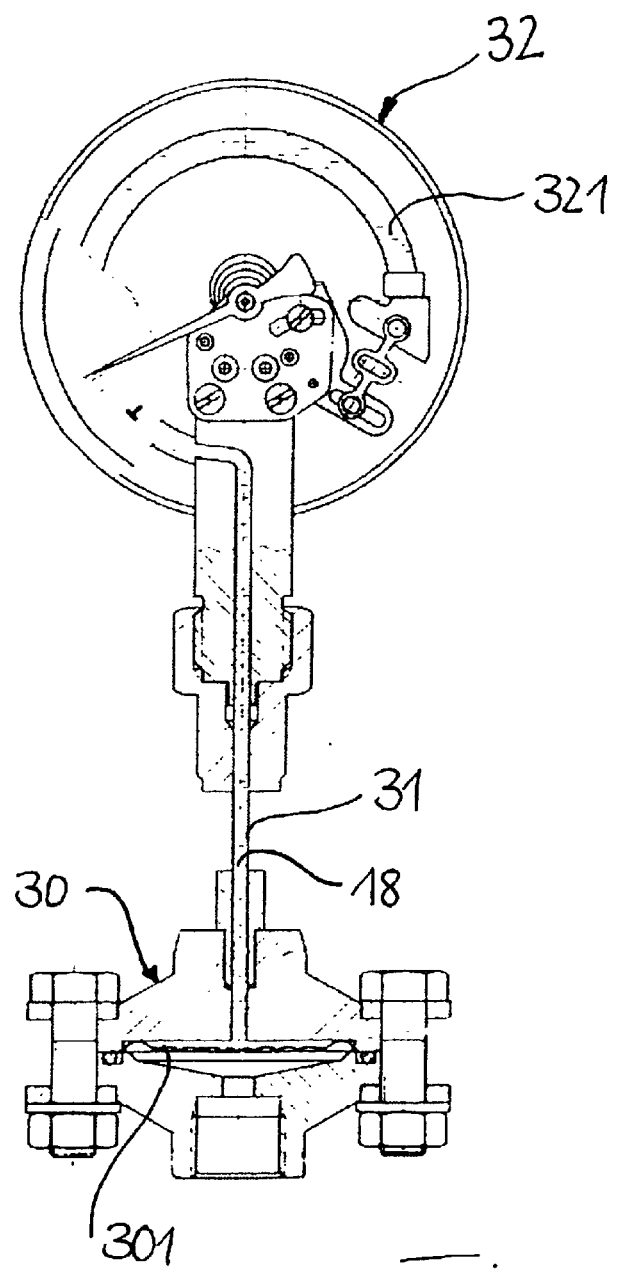

FIG. 3 sectional view of a diaphragm pressure transmitter with a gage attached thereto. However, before going into detail about the pressure transducer and the pressure transmitter, respectively, Table 1 summarizes the essential properties of the transfer fluid.

| Name of the material | polyalphaolefin |
|---|---|
| Short name | PAO 6 |
| Appearance | clear |
| Viscosity at 40° C. | 29.0 to 32.9 mm$^2$/s |
| Viscosity at 100° C. | 5.7 to 6.1 mm$^2$/s |
| Flash point | at least 215° C. |
| Density at 15° C. | 810 to 840 kg/m$^3$ |
| Pour point | max. −60° C. |
| Total acid number | max. 0.05 mg KOH/g |

Polyalphaolefin is approved by the U.S. Food and Drug Administration (FDA) as safe for use in food technology and can, consequently, be used in pressure transducers and pressure transmitters for the food industry.

The pressure transducer depicted in a sectional view in FIG. 1 has an external housing, referenced in general by 2, that has a pressure connection 3 on one end and is connected on the other end to additional measurement value detection devices (not shown) by means of a connector 4 that serves as an electrical connector. These measurement value detection devices also include a power supply for the pressure transducer.

Also arranged inside the external housing 2 are signal processing electronics that are connected with the electrical connector 4 on the one hand and with a sensor element 1 on the other. The pressure connection 3 is penetrated by a channel 31 that runs from the tip of the pressure connection 3 to the sensor element 1. The channel 31 may also be provided on the side of the pressure connection 3 on the tip of the pressure transducer with a diaphragm flush with its front (not shown) that separates the channel 31 from the substance to be measured. This procedure is, for example, advantageous with aggressive substances to be measured or with substances that contain solids. In this case, the channel 31 is filled with transfer fluid.

The sensor element 1 is depicted in an enlarged sectional view in FIG. 2. The sensor element 1 has a housing or an annular body 10 with a stepped bore that is sealed by a sensor support 11 in order to form a first space 21. The sensor support 11 holds piezoelectric sensor component 12 that is firmly affixed thereto and is connected electrically conductively by wires 17 with contacts 13, which are sealingly and electrically isolatedly inserted into the sensor support 11.

A diaphragm 14 is sealingly attached around the edges on the lower end of the annular body. The diaphragm 14 and the annular body 10 delimit a second space 22 that is connected via a channel 15 of the stepped bore of the annular body 10 with the first space 21 delimited by the annular body 10 and the sensor support 11. As indicated by reference character 18, the two aforementioned spaces 21 and 22 as well as the channel 15 are filled void-free with the transfer fluid. Thus, a change in position or deflection of the diaphragm 14 results in displacement of a volume of the fluid from the space 22 into the space 21 or vice versa, whereby the silicon diaphragm (not shown) of the sensor component 12 is deflected and delivers an electrically detectable signal. A differential pressure line 19 arranged on the back side of the sensor component 12 and penetrating the annular body 10 is usually connected with the environment and permits the deflection of the silicon diaphragm (not shown) of the sensor component 12.

For void-free filling of the sensor element 1 with the transfer fluid, a sealable plug receptacle 16 that opens according to FIG. 2 into the second space 22 is designed in the annular body 10. For filling, the sensor element 1 is placed in a container and the container is then evacuated. Then, the container is flooded with transfer fluid and the transfer fluid penetrates void-free into the spaces 21 and 22 as well as the channel 15 of the sensor element 1 and completely fills them. Then, the plug receptacle 16 is sealingly closed with an appropriate plug (not shown).

For the sake of completeness, it must also be mentioned that the annular body 10 has a diaphragm bed on the side facing the diaphragm 14 against which the diaphragm can rest if the admissible measurement pressures are exceeded, to prevent excessive stretching or rupture of the diaphragm.

In another form (not depicted in detail) of the transfer fluid polyalphaolefin discovered according to the invention in an electrical pressure transducer, the sensor element may also be a thin-film sensor element that is applied using thin-film technology to a sensing diaphragm usually made from stainless steel. In this case, the isolating diaphragm on the annular body is not absolutely essential due to the good media resistance of stainless steel. However, in many applications the so-called front flush diaphragm is provided at the tip of the pressure connection of the pressure transducer such that the space between the sensing diaphragm and the front flush diaphragm must be filled with the transfer fluid to obtain a functional pressure transducer. The front flush diaphragm may also be provided on the pressure connection of a piezoresistive pressure transducer; then, the spaces delimited by the diaphragms must likewise be filled with transfer fluid.

Another application of the transfer fluid polyalphaolefin is the filling of pressure transmitters. Pressure transmitters are available in diaphragm, reed, or tube design.

FIG. 3 depicts a schematic sectional view of a diaphragm pressure transmitter 30 that is linked via a capillary line 31 with a gage 32. The diaphragm 301 is acted on from the bottom in FIG. 3 by the substance to be measured and is deflected accordingly. The volume change in the space delimited by the membrane 301 in the pressure transmitter 30 causes a displacement of a corresponding volume of transfer fluid 18 through the capillary line 31 into the measurement element 321 (a Bourdon tube) of the gage 32. The measuring element is deformed according to the volume change and the deformation is displayed for reading on a dial indicator. The capillary line may also serve as a remote line if the pressure measurement device and the gage are arranged at a distance from each other for technical, safety, or organizational reasons. In this case, the viscosity of the transfer fluid assumes special significance since the speed of the volume displacement through the capillary line, which then serves as a remote line, decisively influences the response speed of the gage. Here, the viscosity can change because of the different temperatures at the measurement point (temperature of the substance to be measured) and at the reading point (ambient temperature); however, the viscosity changes in polyalphaolefin are minor enough to obtain good results with the transfer fluid.

As is discernible in FIG. 3, the gage is also filled with transfer fluid. The non-corrosive properties of the transfer fluid polyalphaolefin are, consequently, also advantageous here and protect the gage.

With the transfer fluid discovered according to the invention, a large number of measurement tasks can be performed, whereby the respective variety of types of pressure transducers or respective differently filled pressure transmitters can be reduced to a relatively small selection. This enables simplification particularly of production control, selection of devices, and inventory. In addition, polyalphaolefin is nontoxic such that the handling of the transfer fluid during manufacture, assembly, and installation is simplified.

What is claimed is:

1. A pressure responsive device comprising a housing and a pressure responsive elastically deformable separating element supported in said housing, said separating element having one side exposed to a substance whose pressure is to be sensed and another side facing a space filled with a pressure transfer fluid, in particular for electrical pressure transducers and pressure transmitters, characterized in that the pressure transfer fluid (18) is a polyalphaolefin (PAO 6) with at least one of the following properties:

viscosity is 29.0 to 32.9 $mm^2/s$ at 40° C. and 5.7 to 6.1 $mm^2/s$ at 100° C.;

flash point is at least 215° C.; and pour point is at least −60° C.

2. Pressure responsive device according to claim 1, characterized in that the separating element is a front flush diaphragm that seals the housing on said one side surface-flush and dead-space-free against said substance.

3. Pressure responsive device according to claim 1, characterized in that the separating element is a diaphragm (14) offset into the interior of the housing such that the pressure connection side of the device forms a channel (31) for the substance to be measured leading to the separating element.

4. Pressure responsive device according to claim 1, characterized by a piezoresistive sensor component (12) in said housing.

5. Pressure responsive device according to claim 1, characterized by a thin-film sensor component in said housing.

6. Pressure responsive device according to claim 1, characterized in that the separating element is a corrugated diaphragm.

7. Pressure responsive device according to claim 1, characterized in that said housing (2) further has signal processing electronics (5) and an electrical connection (4).

8. Pressure responsive device according to claim 1, characterized in that the separating element is a diaphragm (301) attached to the housing around its edges.

9. Pressure responsive device according to claim 1, characterized in that the separating element is a circular diaphragm.

10. Pressure responsive device according to claim 1, characterized in that the separating element is a circular ring diaphragm.

11. Pressure responsive device according to claim 1, characterized in that the housing has a diaphragm bed to support the diaphragm.

* * * * *